Nov. 20, 1923. 1,475,040
C. VAN STEENBERGEN
TIRE CHAIN
Filed Feb. 15, 1923

Inventor
C. Van Steenbergen
By D. Swift
Attorney

Patented Nov. 20, 1923.

1,475,040

UNITED STATES PATENT OFFICE.

CARL VAN STEENBERGEN, OF NEWTON, IOWA.

TIRE CHAIN.

Application filed February 15, 1923. Serial No. 619,174.

*To all whom it may concern:*

Be it known that I, CARL VAN STEENBERGEN, a citizen of the United States, residing at Newton, in the county of Jasper, State of Iowa, have invented a new and useful Tire Chain; and I do hereby declare the following to be a full, clear, and exact description of the invention, such as will enable others skilled in the art to which it appertains to make and use the same.

The invention relates to tire chains, and has for its object to provide a device of this character wherein a maximum amount of chain is disposed on the tread of a tire whereby a maximum traction is obtained, thereby reducing the possibility of skidding or spinning of the wheels to a minimum.

A further object is to provide a tire chain comprising side chains and substantially right angularly disposed crossed chains, thereby providing V-shaped opposed gripping recesses for gripping the ground, no matter whether the vehicle is going ahead or backwards or skidding laterally. Also to connect the intersecting chains to rings.

A further object is to provide a connecting member for the side chains comprising a U-shaped body, one arm of which is connected to one end of the chain, the other arm being provided with a hook adapted to be passed through a link carried by the adjacent end of the chain and moved to a position where the hook will engage over the first mentioned end of the chain. Also to provide means for preventing the hook from coming out of engagement with the chain.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
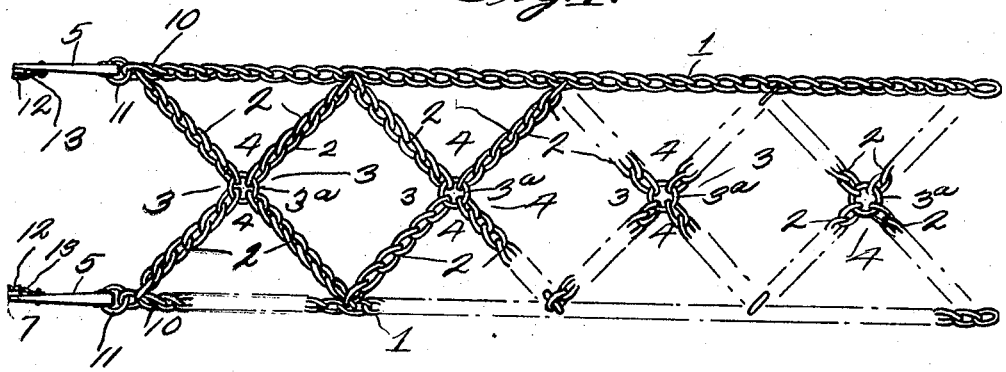
Figure 1 is a top plan view of a section of the chain.

Referring to the drawing, the numeral 1 designates the side chains which are adapted to be disposed adjacent the sides of an automobile tire, and 2 diagonally arranged cross chains, which chains are disposed at substantially forty-five degrees to the side chains 1, and have their inner adjacent ends connected to centrally disposed rings 3. It will be seen that the chains 2 form substantially right angularly shaped recesses 3 which recesses are V-shaped and will grip the ground for affording maximum traction, no matter whether the vehicle is moving forwardly or backing, thereby preventing spinning of the wheels. The chains 2 also provide oppositely disposed V-shaped recesses 4, which are transversely disposed, which recesses grip the ground and prevent lateral skidding of the automobile. It will be seen that a maximum chain engagement with the ground is provided and that the V-shaped recesses will form a positive gripping of the ground. The number of links may be varied in the chains 2, according to the size of wheel, and the size of the rings 3, also the type of link.

Figure 2:
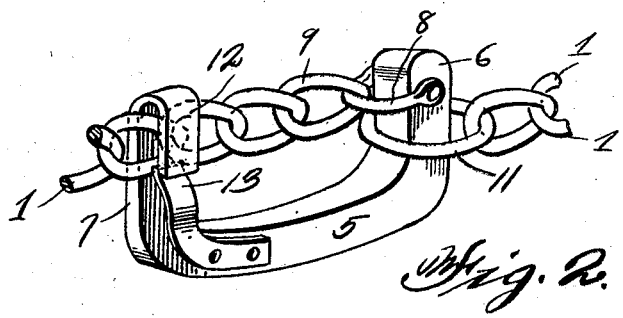
Figure 2 is a perspective view of the securing means for the adjacent ends of the side chains.
Figure 3:
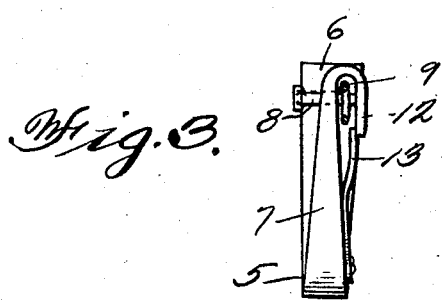
Figure 3 is an end view of the chain securing member.

The adjacent ends of the side chains 1 are connected together by U-shaped members 5. Each U-shaped member 5 is provided with spaced arms 6 and 7, substantially in parallel relation to each other. The arm 6 has pivotally connected thereto a shackle 8, to which is connected the end 9 of the side chain 1. The adjacent end 10 of the chain 1 is provided with a ring 11, through which ring the arm 7 is passed and the U-shaped member moved to a position where it will be received on the arm 6. The arm 7 terminates in a hook 12 adapted to engage over the end 9 of the chain 1 for holding the U-shaped member against movement, however a spring 13 is provided for preventing the hook from coming off the chain. It will be seen that when the U-shaped member is inserted through the ring 11 and moved to the position shown in Figure 2 that the adjacent ends 9 and 10 of the chain 1 will be drawn together, thereby tightening the tire chain as a whole.

From the above it will be seen that a tire chain is provided, which is simple in construction, and one wherein the maximum traction is obtained. It will also be seen that the securing device for the adjacent ends for each side chain is simple in construction and positive in its operation and constructed in such a manner that it cannot become unhooked.

The invention having been set forth what is claimed as new and useful is:—

The combination with the adjacent ends of a tire chain, of a tightening device therefor, said device comprising a U-shaped member, parallel arms carried by said U-shaped member, a hook carried by one of the parallel arms and adapted to receive the chain adjacent one of its ends and of greater depth than the width of the chain, said chain end being in turn pivotally connected to the other parallel arm and when tightened disposed at a right angle to the last named arm, said U-shaped member extending through a link carried by the other adjacent end of the chain to a position where said link engages the last named parallel arm and spring means cooperating with the hook for preventing the hook from coming out of engagement with the chain.

In testimony whereof I have signed my name to this specification in the presence of two subscribing witnesses.

CARL VAN STEENBERGEN.

Witnesses:
E. J. BIRCHARD,
JAY CLARK.